United States Patent [19]

Wyatt et al.

[11] Patent Number: 4,939,988

[45] **Date of Patent: * Jul. 10, 1990**

[54] ANTI-CORING GRAIN TREATMENT SYSTEM

[75] Inventors: W. Gerald Wyatt, Arlington, Tex.; Jim Bleke, Wolcottville, Ind.

[73] Assignee: VE Holding Corp., Arlington, Tex.

[ * ] Notice: The portion of the term of this patent subsequent to Apr. 4, 2006 has been disclaimed.

[21] Appl. No.: 262,430

[22] Filed: Oct. 25, 1988

Related U.S. Application Data

[63] Continuation of Ser. No. 766,640, Aug. 16, 1985, Pat. No. 4,817,518.

[51] Int. Cl.[5] ..... A23K 1/00

[52] U.S. Cl. ..... 99/516; 99/471; 99/483

[58] Field of Search ..... 99/467, 470, 471, 473–475, 99/483, 516, 518, 534, 536; 426/461, 463, 465, 507, 511, 518, 519; 34/15, 26, 33, 34, 37, 170; 366/144, 340

[56] References Cited

U.S. PATENT DOCUMENTS

| | | | |
|---|---|---|---|
| 44,151 | 9/1864 | Ballard et al. | 99/471 |
| 728,859 | 5/1903 | Caldwell et al. | |
| 805,709 | 11/1905 | Caldwell et al. | 99/471 |
| 911,408 | 2/1909 | Jensen | 99/471 |
| 1,174,721 | 3/1916 | Henson | 426/511 |
| 1,185,622 | 6/1916 | Boss | |
| 1,256,017 | 2/1918 | Hicks | 99/471 |
| 1,574,210 | 2/1926 | Spaulding | 426/511 |
| 1,626,805 | 5/1927 | Forrest | 99/471 |
| 1,914,342 | 6/1933 | Larsen | 99/471 |
| 2,397,350 | 3/1946 | Hayden et al. | 252/317 |
| 2,656,007 | 10/1953 | Arnold et al. | 183/42 |
| 3,703,861 | 11/1972 | Slack et al. | 99/471 |
| 3,778,521 | 12/1973 | Fisher et al. | 99/80 |
| 4,024,288 | 3/1977 | Witte | 426/461 |
| 4,128,052 | 12/1978 | Mueller et al. | 99/516 |
| 4,185,547 | 1/1980 | Nakazato et al. | 99/453 |
| 4,231,844 | 11/1980 | Weber et al. | 201/34 |
| 4,249,909 | 1/1981 | Comolli | |
| 4,255,459 | 3/1981 | Glen | 426/521 |
| 4,329,371 | 5/1982 | Hart | 426/461 |
| 4,401,019 | 8/1983 | Leonov et al. | 99/471 |
| 4,421,020 | 12/1983 | Gross | 99/472 |
| 4,508,029 | 4/1985 | Malone | 99/516 |
| 4,581,238 | 4/1986 | White et al. | 426/331 |
| 4,600,594 | 7/1986 | Bartesch et al. | 426/443 |
| 4,644,967 | 2/1987 | Wyatte et al. | 137/599 |
| 4,704,804 | 11/1987 | Wyatt et al. | 34/15 |
| 4,817,518 | 4/1989 | Wyatt et al. | 99/516 |

FOREIGN PATENT DOCUMENTS

| | | |
|---|---|---|
| 107793 | 7/1937 | Australia . |
| 124830 | 8/1945 | Australia . |
| 144840 | 5/1948 | Australia . |
| 201189 | 1/1955 | Australia . |
| 203322 | 8/1955 | Australia . |
| 417176 | 4/1968 | Australia . |
| 16897/67 | 7/1968 | Australia . |
| 404088 | 7/1968 | Australia . |
| 511969 | 4/1979 | Australia . |
| 515106 | 8/1979 | Australia . |
| 525158 | 4/1981 | Australia . |
| 547755 | 1/1983 | Australia . |
| 572897 | 4/1985 | Australia . |

*Primary Examiner*—Timothy F. Simone
*Attorney, Agent, or Firm*—Johnson & Gibbs

[57] ABSTRACT

A grain treatment system incorporating a steam vessel and centrally disposed, grain diverting steam sparger unit for facilitating the flow of homogeneous plugs of grain therearound. The system incorporates a discharge unit having garner valves and/or flow restrictors for facilitating the anti-coring grain flow through the steam vessel with side and corner draw-off therein and the even percolation of steam upwardly therethrough for uniformly heating and moisturizing the grain. A vapor generator is used for providing a heating medium comprising a mixture of condensible and non-condensible gases introduced into the grain through the centrally disposed steam sparger. In this manner, homogeneous plugs of grain are uniformly passed through and discharged from the grain treatment system permitting controlled heating and moisturizing of grain and substantially eliminating problems of coring, grain clingage, static sludge build-up and associated grain treatment problems prevalent in many prior art systems.

13 Claims, 2 Drawing Sheets

ANTI-CORING GRAIN TREATMENT SYSTEM

This is a continuation of application Ser. No. 766,640, filed Aug. 16, 1985, and issued on Apr. 4, 1989 as U.S. Pat. No. 4,817,518.

BACKGROUND OF THE INVENTION

1. Field of the Invention

The present invention relates to grain treatment systems and, more particularly, to an anti-coring, corner draw-off temperature conditioning system for select heating and liquid constituent control of grain through a heating medium comprising a mixture of condensible and non-condensible gases.

2. History of the Prior Art

The prior art is replete with grain treatment systems for improving the food value and animal digestibility. Many of these systems, incorporate steam chests and a process of direct contact heat exchange wherein the temperature of the heating medium is the single-most critical operational parameter. The contact is generally made between the substance to be heated and the products of combustion from a boiler, furnace or the like. In the case of grain treatment, steam from boilers is usually vented into the steam chest which comprises a vertical hopper through which the grain is allowed to fall. Steam injected into the bottom of the hopper rises to heat and moisturize the grain. Problems have arisen in the areas of proper temperature and time control as well as steam generation.

The prior art of steam chests extends into technological antiquity with steam utilized for heating tobacco leaves, grain, flour and animal feed. As stated above, grain used as animal feed is often treated with steam to improve its digestibility by the animal as well as food value. The steam which heats the grain is preferably injected into the grain immediately prior to feeding the animals to both heat it and raise the moisture level to around 24%. Generally the grain coming to the system is relatively dry often having between eleven and twelve percent moisture at ambient temperatures. Conventional steam system conditioning equipment raises the temperature of the grain as close as possible to approximately 190° to improve commercially established digestibility characteristics such as starch availability. It is, of course, necessary to assure that none of the grain gets so hot so as to scorch it or break down the vitamin additives. Unfortunately with live steam, the maximum grain temperature rise that can be produced by a boiler system without producing a wet product is approximately 120° F. An adequate boiler can thus produce 200° F. grain only when the incoming grain is at or above 80° F. At other times, and particularly in the winter, grain temperature of about 160° F. to 180° F. is the maximum. The amount of energy necessary to generate such quantities of steam are also of major concern.

Other prior art grain treatment systems have addressed the need for moisture control with apparatus which introduces steam and air in combination. For example, U.S. Pat. No. 1,185,622 to Boss teaches a 1916 process of conditioning food forming substances. The Boss patent sets forth the moisture treatment of grain or the like in such a manner that it is hydroscopically conditioned by either adding or taking moisture from such particulate matter. These systems are useful in preparing the grain to a condition where it is uniformly hydrous in its character. Such product is more thoroughly digested in given quantities, in shorter time and with greater nutritive and body building effect. It has thus been a goal in the prior art grain condition technology to provide a treating "fluid" and system therefor capable of delivering or withdrawing moisture or other substance to or from the material to be acted upon for swelling or shrinking or wetting or drying the material as needed. To affect this end result, air and steam have been utilized in various heating and flowing configurations such as that initially shown in the Boss patent. This prior art does not envision heating the grain to a controlled higher temperature so as to cook it for better digestibility. More importantly, it does not envision the functional problems of handling the grain efficiently with more advanced technology.

More advanced prior art grain treatment technology in steam chests have generally included refinements on the age old principle of steam moisturizing. For example, U.S. Pat. No. 1,574,210 to Spaulding teaches a method and apparatus for steaming grain and the like. A steam chest is thus taught. The Spaulding steam chest utilizes gravity descent and angularly disposed baffles for deflecting the grain. Steam supply ports are provided for the steaming operation of the grain during its descent. A prior U.S. patent issued to Henson under U.S. Pat. No. 1,174,721 sets forth an improved method of supplying moisture to grain and the like by utilizing the flow of steam and air heated by said steam prior to entry into a treatment chamber. Moisture is added to the grain by introducing steam with the air prior to entry into the treatment chamber. The Henson patent further teaches the use of a hygrometer to determine the moisture content of the air. Grain which is fed into the interior of the mixing treatment chamber comes in contact with the vapor which tends to condense thereupon. In this manner, the amount of moisture deposited in the substance passing through the treatment chamber may be calculated from the data given. Such a system will also work with raw steam being used instead of the mixture of steam and air.

These prior art steam chest systems have been shown to be effective for removing or adding moisture to grain. Unfortunately, many problems exists such as grain clinging, bacterial residue, heat loss after shutdown, and particularly coring in conventional steam chest structures. The degree of heat and moisture contributed to the grain is also generally hard to control and/or define in any empirical manner short of raw data measurements such as that discussed above. Conventional prior art systems simply do not prevent coring and the problems recited above, nor do they envision control of heat added to the grain or the time in which the grain is exposed to the heat, as discussed below.

Conventional steam chest grain processing vessels are generally fabricated from planar sheet metal into rectangular units adapted for receiving grain therein. Steam is injected in the lower regions of the steam chests and allowed to percolate up through the descending grain. The grain flow system is generally regulated by a lower discharge port in a lower region of the vessel. The discharge region is preferably tapered and a continuous grain feed is provided therefrom. A myriad of problems prevail with such structures, including the fragility of the overall steam chest and the grain treatment efficiency therein. The planar walls generally do not provide sufficient structural strength to permit pressurization of the steam chest which is often necessary for elevating grain temperatures during processing therein.

Moreover, the rectangular configuration creates four corner regions which are by definition outwardly of any symmetrically tapered grain discharge area. For this reason grain within the corner regions of the steam chests are inhibited from flow therein. Traditional laminar flow equations may be applied in conjunction therewith to mathematically explain the phenomena of "coring" within such steam vessels. Coring is produced when the grain adjacent the side walls and in the corners of the steam chests stacks in place and forms a central tunnel therethrough where the grain falls. Generally the central core where the grain funnels through is circular in cross-section and of a diameter much less than that of the steam chests. In fact, flow areas of 25-30% of the overall cross-sectional area of the steam chest is not unusual.

Aside from flow problems in conventional steam chests as described above, accumulation of packed grain in the side and corner regions of the vessel produces a second equally serious problem. Steam percolating up through the steam chest is absorbed by the stagnating grain therein, further enhancing the sticking and jam configuration thereof as well as inducing the growth of bacteria from the moisture and heat imparted thereto. During shut down of the operation at the end of an operation cycle, the grain is left within the steam chest for further bacterial growth and cooling of the steam chest itself. Because of the moisture laden grain, conductive cooling to the side walls of the vessel is greatly expedited necessitating more energy for start up operation in the next cycle. For example, steam chests which cool to ambient during the night period will require almost twice as many btu's for start up than a steam chest whose temperature only drops a few degrees during the shut down period. Such a steam chest having improved heat retention characteristics can substantially reduce the operational costs in grain processing. Moreover, steam chests capable of continuous scouring of the sides to eliminate any sticking or residual grain therein would eliminate the wet, conductive cooling of the steam chest during the shut down period as well as the growth of bacteria therein. Bacterial growth also affects not only the stagnant grain but grain passing therethrough which is exposed to the stagnant side wall sections. Contamination is thus a third factor in the design consideration of such units.

Aside from steam chest systems, more advancement in technology has addressed the issue of control of various aspects of the steam itself in steam systems. These aspects include both the adding of moisture to and removal of moisture from particulate matter of a general nature. For example, U.S. Pat. No. 4,024,288 issued to Witte illustrates a method of treating particulate matter for conditioning oil containing vegetable raw materials. In the Witte patent, air and steam are again utilized for the treatment of the raw material. The utilization of super-heated steam coming from a heat exchanger which is then mixed with air is set forth and shown in the Witte reference and discloses an effective means for immersing the raw material into a steam and hot air bath. Material leaving the bath is then dried by air issuing from a hot air heat exchanger. While effective in heating by means of steam, Witte maintains little control over the temperature to which the raw material is heated and requires two separate fluid streams to attain the desired temperature and moisture levels. This system is not particularly adapted for addressing the "functional" problems set forth above for grain steam chests.

U.S. Pat. No. 4,249,909 issued to Comolli is yet another technological advancement which sets forth a staged process for drying wet carbonaceous material. The staged drying procedure permits wicking up of hydrocarbons contained in coal to seal the surface of dried coal products sufficient to prevent appreciable reabsorption of moisture and consequent heating and spontaneous ignition. The Comolli procedure was developed for this particular application and in so doing manifested the advances made in the state of the art in steam treatment systems. These advances may be seen in part in the efforts to define and control various parameters of steam such as partial pressures. The pressures exerted by each constituent alone in the volume of a mixture at the temperature of the mixture are called partial pressures. The partial pressure is directly related to the mole fraction of a constituent present in a mixture and the total pressure thereof. However, to control partial pressure it is necessary to provide an adequate treatment chamber which evenly distributes and conditions the grain passing therethrough. These aspects are set forth above and comprise the critical difference between acceptable and unacceptable steam chest systems.

It may thus be seen that the treatment of grain in steam chests has been an area of marked technological evolution through the years. The advantages of steam as a moisturizing and heating medium for other food stuffs as well as grain may likewise be useful if the end product can be selectively controlled. Conventional treatment processes for cellular matter such as grain generally use raw steam as a sole element of a heating medium or in combination with air or similar non-condensible gases for the moisturizing process. As stated above, such processes are typically incapable of effectively treating the grain in the precise manner necessary for maximum utilization and adequate grain "stagnated" and "coring" control. For example, specific moisture levels, heat absorption and final grain temperatures must be obtained in a uniform fashion for reliable and effective conditioning. Reasons for the inability of conventional apparatus to meet such demands of the market are due to their inability to evenly and homogeneously process a given quantity of grain whereby each section of grain is treated for an equal time to a select condition.

Most conventional grain treatment systems incorporate a tank wherein grain is allowed to funnel downwardly through a central aperture or gate. Steam pipes are inserted into the tank body and steam discharged therefrom is utilized to heat and moisturize the grain funnelling therethrough. Unfortunately, the passage of grain within the tank is not uniform and, in fact, tends to core down the center as discussed above. The grain is therefore, not homogeneously treated by the injected steam and grain stagnation results. The treatment tank is thus an integral element of appropriate grain processing and conventional technology has generally not addressed appropriate steam or grain flow controls therethrough.

The prior art systems as shown in the aforesaid patents which permit a flow of unpacked grain to be channelled through a series of baffles is not generally commercially utilized due to the vast quantities of grain being treated and operational constraints associated therewith. Grain is generally carried by box cars and conveyors belts in large volumes which quickly fill treatment vessels utilized for temperature conditioning. The fact that the grain fills the vessel has not been deemed to be a critical problem in the temperature treatment thereof. This is not the case. The flow patterns of grain funnelling and coring through such tanks generally prevents homogeneous grain treatment. When a column of grain is flowing vertically downward in a steam chest or holding bin, the grain along the walls will tend to slow down due to friction at the wall. The stacking of the grain can, in some instances, show a "bridging" effect which greatly slows the movement near the walls and speeds movement in the center for a given average grain flow rate. Also, the grain will tend to form a moving column in the middle if the opening at the bottom is smaller than the steam chest itself. For example, a central aperture at the lower end of a hopper or tank only allows grain situated in the central region of the tank to fall first. The grain around the outside walls thereof generally fall in on top of the funnel of grain passing therebeneath. As new grain is inserted into the tank, it also falls down through the center leaving the grain situated along the side walls to prolonged exposure in the steam within the tank. This grain becomes moisture laden and prone to bacterial growth. The grain funnelling through the central region thereof is, likewise exposed to this bacteria and is treated for a short period of time by the steam injected therein. Therefore, the type of heat treating fluid as well as the processing vessel are critical elements of an homogeneous and effective grain treatment system.

It would be an advantage therefor to overcome the problems of the prior art by providing a system for select temperature and moisture conditioning of grain by an effective heating medium injected into a processing vessel which uniformly carries grain therethrough without coring. The system of the present invention affords such an operation by utilizing a vapor generator, or the like, in conjunction with an upstanding vessel having grain discharge means disposed therein for uniformly passing homogeneous plugs of grain therethrough and simultaneously scouring all interior surfaces and all corner regions therein (i.e. corner draw-off). The amount of heat and moisture supplied to the grain may therein be controlled by the rate of fuel burning of the vapor generator or by pressurization, while the time the grain is exposed thereto may be controlled by the time in which the grain is allowed to pass through the vessel. More food value can thus be supplied in the grain with less energy expended in steam generation.

SUMMARY OF THE INVENTION

The present invention pertains to conditioning systems for grain affording controlled heating and moisturizing thereof. More particularly, one aspect of the invention comprises an improved grain treatment system of the type wherein a vessel is provided for the passage of grain therethrough with a plurality of steam vents supplied therein for uniformly discharging steam within the vessel. In this manner the grain is properly heated and moisturized within the vessel. The improvement comprises means for passing homogeneous plugs of grain in the vessel uniformly therethrough and means for injecting steam into the grain. The system thus exposes grain to a uniform heat and time periods necessary for controlled heating and moisturizing thereof without the deleterious coring or grain stagnation.

In another aspect, the invention includes the system as set forth above including means for discharging the grain from the vessel comprising a diverting member centrally disposed within the vessel for channeling grain flow outwardly thereof and promoting grain plug flow from the sides and middle of the vessel in a uniform manner. In one embodiment the discharge means comprises at least one, and, preferably first and second garner valves disposed beneath the grain for selectively closing and sealing the vessel to prevent the egress of steam from the lower end thereof. The user of garner systems is, of course, not new to passive grain handling wherein weight and measurement stations have used garners for decades to control the quantity of grain passing from a scale hopper or the like. However, the present invention utilizes a garner system as an active grain processing control element in one of a number of grain plug flow processes. With a dual valve garner system, the processing steam of the present invention is forced to remain within the vessel and propagate upwardly therethrough in exposure of homogeneous plugs of grain falling downwardly therein. Also by rapidly opening an underlying grain valve, the grain can be forced to fall as a plug until the void between the two valves (or any other space defined by a flow restrictor) is filled A single valve may thus be used as may a flow restriction area in conjunction with steam venting means therein.

In another aspect, the invention includes the garner system described above wherein the steam is injected into the vessel through a steam sparger comprising a conduit housed within an apertured canopy. The canopy has a multitude of perforations and extends in the central region of the vessel whereby steam issuing from the conduit is diffused while grain is forced to pass therearound. In accordance with one embodiment the steam is produced by a vapor generator and injected into the vessel in conjunction with non-condensible gases produced by the vapor generator Steam conditions can therein be controlled by the rate of burning and amount of air and water mixed therewith. Moreover, the controlled steam is available on demand rather than stored as in boiler configurations.

In yet another aspect, the invention includes an improved method of treating grain with moisture and heat of the type wherein a vessel is provided for the passage of grain therethrough with a plurality of steam vents supplied therein. The steam vents discharge steam within the vessel for the heating and moisturizing of grain therein. The improvement comprises the steps of passing grain through the vessel in uniform plug flow whereby all grain is treated equally without coring. Steam is injected into the vessel through a central steam sparger comprising a canopy or "hat" for uniformly exposing and heating the grain. Finally the time period for the heating and moisturizing of the grain is controlled by discharging the grain from the vessel at a controlled rate and in a manner sealing the steam therein. The means for discharging the grain comprises at least one diverting member centrally disposed within the vessel and which may comprise the steam canopy. The member diverts grain flow outwardly thereof and promotes uniform grain flow passage through the vessel especially when used in combination with the rapid opening valve one causing the grain to fall in plug flow. Homogeneous plug flow as used herein refers to generally level sections of grain dropping or flowing as "plugs" of matter through the vessel as compared to coring and stagnant grain accumulation areas of the prior art variety.

In yet a further aspect, the invention comprises the method set forth above wherein the step of discharging the plugs of grain comprises the step of disposing first and second valves beneath the diverting member for selectively closing and sealing the vessel to prevent the egress of steam from the lower end thereof. In this manner, the steam is forced to remain within the vessel and propagate upwardly therethrough in exposure of the grain passing downwardly therethrough. The step of injecting the steam into the vessel includes the step of providing a steam supply conduit and housing the conduit within an apertured canopy centrally disposed in the vessel. The steam issuing from the conduit is thus diffused through the apertures of the canopy for exposure to the grain. The step of discharging the steam includes the step of producing the steam with a vapor generator and injecting it into the vessel in conjunction with non-condensible gases produced by the vapor generator. The non-condensible gases further serve to insulate the grain from moisture condensation along chamber side walls during shut-down periods.

In another aspect, the invention comprises an improved grain treatment system of the type wherein a vessel is provided for the passage of grain therethrough the plurality of steam vents supplied therein for discharging steam within the vessel for the heating and moisturizing of grain within the vessel. The improvement comprises a generally cylindrical vessel having a plurality of generally conical shaped hats suspended therein for channeling the flow of grain therearound in a uniform plug or slug flow pattern and means for injecting steam into the cylindrical vessel to expose grain uniformly flowing therein for generally uniform time periods in the heating and moisturizing thereof. The means for discharging the grain comprises at least one garner, or gate, valves vertically disposed above a lower flow restrictor or a second valve for isolating a plug of grain therebetween and substantially preventing the escape of steam from the vessel. Some steam will escape without a second valve although the grain is still allowed to fall as a uniform plug without clingage, static sludge buildup, and associated cooking problems. The valve or valves, comprise rotary plates having a plurality of apertures formed therein assembled for selective registration one with the other for uniform perimeter and corner draw-off and the homogeneous flow of grain therethrough. The steam is injected into the cylindrical vessel through a conduit housed within one of the hats secured therein whereby steam issuing from the conduit is diffused through the apertures of the hat for exposure to the grain. The steam is preferably produced by a vapor generator and injected into the vessel in conjunction with non-condensible gases produced by the vapor generator to facilitate handling and uniform flow therein The means for discharging the grain may comprise a conduit channeled upwardly to a height relative to the vessel wherein the steam pressure therein is substantially reduced to permit egress of grain therefrom while maintaining the steam pressure within the vessel. The conduit is preferably flexible and supported on a distal end by means for lowering the conduit to facilitate the discharge of grain therefrom and the control of steam within the vessel. The vessel may also be adapted for pressurization through the injection of steam therein and wherein steam is biased for upward travel through the vessel in a direction countercurrent to the flow of grain therethrough for exhaust from the upper end thereof.

In yet a further aspect, the invention comprises an improved method of treating grain with moisture and heat of the type wherein a vessel is provided for the passage of grain therethrough with a plurality of steam vents supplied therein for discharging steam within the vessel for the heating and moisturizing of grain within the vessel. The improvement comprises the steps of providing a cylindrical vessel, reinforcing the cylindrical vessel for withstanding steam pressures therein, injecting steam into the vessel to generate steam pressure therein and expose grain therein for generally uniform time periods in heating and moisturizing, and providing a plurality of baffles or canopies within the vessel spaced one from the other for channeling the flow of grain therearound to facilitate the uniform passage of grain downwardly therethrough without coring. The step of discharging the grain comprises the step of providing first and second valves beneath the vessel. The first valve can be opened rapidly to allow the grain to drop as a uniform slug. The two valves work together selectively closing and sealing the vessel to prevent the egress of steam from the lower end thereof, and forcing the steam within the vessel to propagate upwardly therethrough and exposure of grain therein while permitting the discharge of grain contained between the first and second valves. The step of injecting steam into the vessel may include the step of providing a conduit housing the conduit within an apertured canopy secured in the vessel, issuing steam from the conduit and diffusing the steam through the apertures of the canopy to uniformly expose the steam to said grain.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
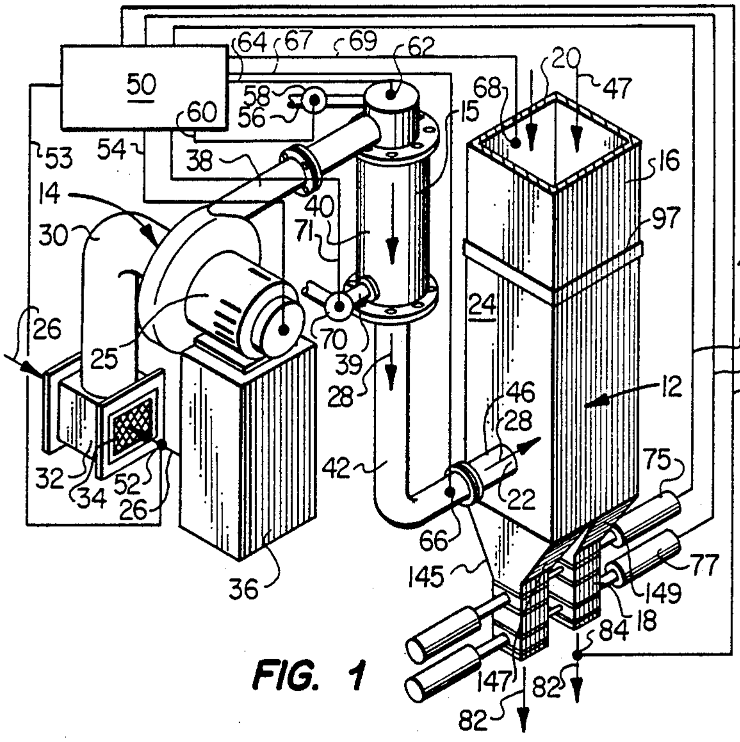
FIG. 1 is a perspective view of one embodiment of the method and apparatus of the present invention illustrating the processing of grain by passage through generally vertical vessel in which is injected steam and non-condensibles issuing from a vapor generator.

Referring first to FIG. 1, there is shown one embodiment of a grain treatment system 10 constructed in accordance with the principles of the present invention. The system 10 comprises a steam vessel 12 and steam generation unit 14. The steam vessel 12 includes a grain process chamber 16 and airlock discharge unit 18. Grain passing from upper portion 20 of the chamber 16 is exposed to steam discharge therein through conduit 22 positioned along side wall 24 of the chamber 16. With the system shown herein select heating and liquid constituent control of grain may be provided through a heating medium comprising a mixture of condensible and non-condensible gases produced by the steam unit 14. Such temperature conditioning has been shown to be both cost effective, more efficient and a more highly productive method of increasing the food value of feed grain with less energy consumption and in a more homogeneous manner.

Still referring to FIG. 1, the steam generation unit 14 comprises a vapor generator unit 15 and blower 25. Input to the vapor generator 15 is supplied by the blower or compressor 25 wherein intake air 26 is heated in the generator 15 and mixed with steam and non-condensibles generated thereby. The unit 14 discharges a hot-gas stream 28 through conduit 22. The air 26 is drawn into the compressor 25 through filter screen 34 covering intake manifold 32 and vectored through intake pipe 30. The blower 25 is mounted upon a support chassis 36 which may also support the related elements of the steam generation unit 14. The blower is then coupled to the vapor generator 15 through an air discharge conduit 38. Air entering the vapor generator 15 supplies the oxidant for combustion occurring therein, which combustion produces heat for raising the temperature of water supplied therein above the vaporization phase in the production of steam. The water supply conduit 39 is thus shown coupled to the body 40 of the vapor generator 15. The water is vaporized by said combustion and discharged through exhaust conduit 42 upstream of discharge conduit 22 coupled thereto by coupling flange 46.

The operation of the vapor generator 12 as shown in FIG. 1, is preferably effected in accordance with the vapor generator set forth and shown in U.S. Pat. Nos. 4,644,967 and 4,704,804, assigned to the assignee of the present invention. In these vapor generator systems, a stoichiometric mixture produces substantially pure exhaust of steam and non-condensible gases comprising a hot gas mixture capable of effective operation in accordance with the principles of the present invention. As said mixture of steam and non-condensibles passes through the grain chamber 16, grain 47 loaded through the upper region thereof is effectively heated for improving the food value thereof as described in more detail below. The heated grain passes through the chamber 16 and is discharged through the airlock discharge unit 18 coupled therebeneath for effecting homogeneous moisture and heat treatment of said grain. In this manner the grain is effectively treated with steam and non-condensible gases 28 in a manner both economically efficient and productionwise effective. By controlling both the travel of the grain 47 within the chamber 16 as well as the mixing ratios and combustion parameters of the vapor generator 15, an extremely homogeneous grain treatment system is provided with cooking temperatures selectively controllable as will be described below.

Referring still to FIG. 1, a control unit 50 is provided for integrating temperature readings of the various processing fluids as well as the grain 47 and controlling the operation of the system 10 in accordance with the principles of the present invention. Temperature sensor 52 is thus disposed in the air intake manifold 32 and coupled to control unit 50 by sensor line 53. Likewise operation of the blower or compressor 25 is controlled by control line 54 coupled to the control unit 50. Fuel is provided to the vapor generator 15 by fuel line 56 regulated by control valve 58 coupled to control unit 50 by control line 60. Performance parameters of the vapor generator 12 are monitored by sensor array 62 coupled to control unit 50 by control line 64. Temperature discharge medium 28 is monitored by sensor 66 disposed in conduit 42 and coupled to control unit 50 by sensor line 67. Grain temperature is likewise monitored by sensor 68 coupled to control unit 50 by sensor line 69 Water flowing through conduit 39 to vapor generator 15 is regulated by valve 70 which is controllable by control unit 50 and coupled thereto by control line 71. Grain 47 passing through chamber 16 is therefore exposed to steam and non-condensible gases 28 which have been produced by selectively controllable parameters in the upstream vapor generation unit 14. The length of time of travel of the grain 47 within chamber 16 is therefore selectively controllable through actuation of the airlock discharge system 18. The airlock discharge system 18 of this particular embodiment is comprised of upper and lower slide gate valve systems 75 and 77, respectively, which are coupled to the control unit 50 through control lines 79 and 80 respectively. Both the control and illustration of the airlock discharge system 18 of FIG. 1 is presented for purpose of illustration only. Finally, the temperature of the discharged grain 82 may be monitored by a sensor 84 positioned beneath the airlock discharge unit 18 which is coupled to the control unit 50 by sensor line 86. In this manner, the control unit 50 may be used to monitor and control the operation of system 10 in accordance with the principles of the present invention.

Figure 2:
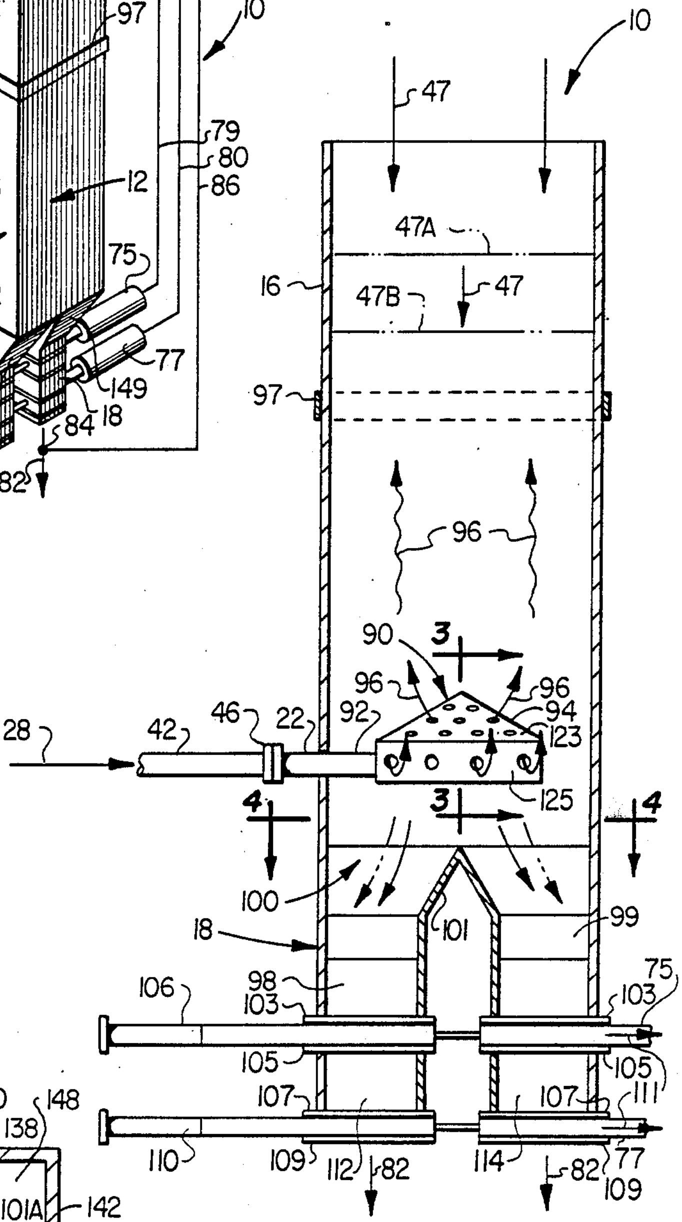
FIG. 2 is a side-elevational cross-sectional view of a grain treatment vessel illustrating one manner of even distribution of grain flow therethrough and an airlock device for effectively containing processing steam therein.
Figure 4:
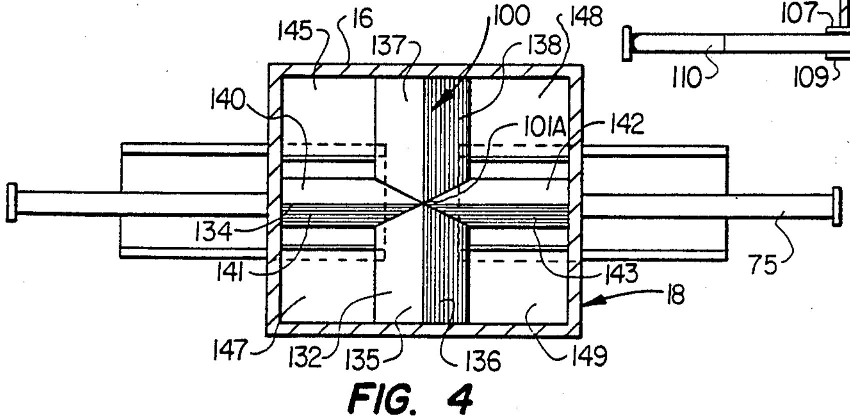
FIG. 4 is a top-plan, cross-sectional view of the discharge system of FIG. 2 taken along lines 4—4 thereof illustrating the angulated quadrant discharge apparatus herein.
Figure 8:
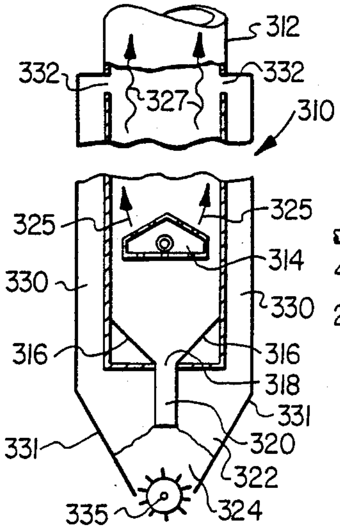
FIG. 8 is a side-elevational view of yet another alternative view of yet another alternative embodiment of a grain discharge system utilizing a flow restriction orifice beneath a flow diverter.
Figure 7:
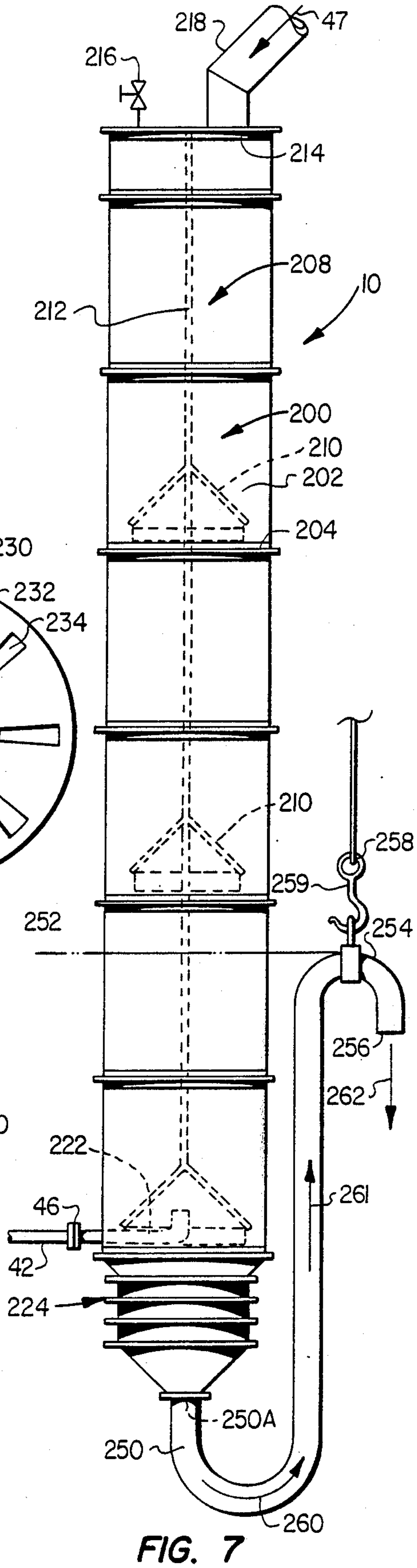
FIG. 7 is a side-elevational view of yet another alternative embodiment of a grain treatment vessel illustrated in another manner of grain distribution and grain discharge therefrom.

Referring now to FIG. 2 there is shown an enlarged, side-elevational, cross-sectional view of one embodiment of a grain treatment chamber 16 constructed in accordance with the principles of the present invention. It should be noted that the particular embodiment of the grain treatment chamber 16 shown in FIGS. 2 and 4 is but one embodiment of said chamber and the method and apparatus of the present invention for uniformly dropping or flowing homogeneous plugs of grain 47, and exposing said grain to the steam and non-condensibles 28 produced by the steam generation system 14 disposed upstream therefrom. The "dropping" action is illustrated by phantom grain lines 47A and 47B, which reflect, among other aspects, the actuation of the grain discharge garner system described herein. This section also defines the "homogeneous plug" of grain as referred to herein. Said plug can be achieved by either "uniform flow" per FIGS. 7 and 8 shown below or by the dropping encountered with the garner valve system of FIGS. 1 and 2. The meaning of the "homogeneous plug" is simply a uniform layer or section of grain from all across the steam chest, produced by the anti-coring baffles described herein and the "corner draw-off" of grain from wall regions of the steam chest When the grain does not "stick" to the walls and does not "core" it can move downwardly as a plug of homogeneous particulate matter. The matter section or plug as defined between lines 47A and 47B is then treatable at select times and temperatures.

Figure 3:
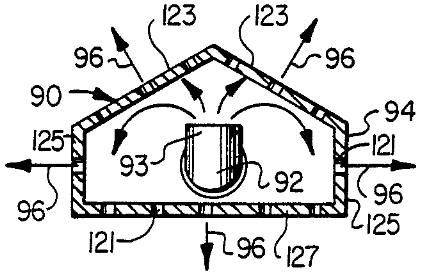
FIG. 3 is an enlarged side-elevational, cross-sectional view of the pyramid shaped flow diverts and steam discharge unit taken along lines 3—3 of FIG. 2 illustrating the diffusion of steam emanating therefrom.

Still referring to FIG. 2 steam is injected into the chamber 16 through the conduit 22 and dispersed therein by steam sparger or diffuser element 90. Steam diffuser 90 of FIGS. 2 and 3 is of a pyramid shape and comprises discharge conduit 92 coupled in flow communication with outer conduit 22 having the pyramid shaped, apertured cowling 94 disposed thereacross. The cowling 94 is preferably constructed with an angular or conical top surfaces (depending on the steam chest shape) for effectively diverting the flow of grain 47 therearound and dispersing steam in a multitude of directions as described in more detail below. The diffuser 90 of this embodiment is secured in the intermediate area of the chamber 16 for purposes of permitting grain to flow evenly therearound. Steam rising from unit 90 thus penetrates a uniform area of grain 47 thereabove for homogeneous treatment in a uniform heating pattern which can be selected for particular grain heating operations. Due to the construction of the airlock and discharge system 18 and the grain flow diverter constructed therein, grain 47 passing thereabove is uniformly distributed and is not subject to agglomeration and central channeling as is so prevalent in prior art steam chambers. The method of flow diversion and steam handling through airlock controls effectively maximizes energy consumption relative to grain heating.

Referring to FIG. 2, there is shown one of the airlock discharge steam and handling systems 18 of the discharge garner system wherein upper and lower slide valves 75 and 77 are provided for sequential actuation dropping the grain uniformly between notional planes 47A and 47B. It should be noted that a single valve may also be used, although some degree of steam can then escape. Finite quantities of grain are thus passed therethrough while the 2 gate garner system prevents the egress of steam therefrom. A single gate would preferably include a steam vent system to prevent high velocity grain discharge. It is desirable that no erratic pressures be exposed to a peg roll feeder of the type conventionally used in steam chest systems. Erratic pressures would change the flow rate through the peg roll feeder. In either manner the bulk of steam 96 is forced to uniformly rise within the chamber 16 for exposure to the homogeneous plugs of grain 47 uniformly therethrough. As stated above, the one or two valve, diverting and steamlock/garner system shown herein is but one embodiment of such a mechanism and alternative embodiments are also disclosed and contemplated in accordance with the principles of the present invention.

The grain and steam discharge system 18 is shown to be comprised of a pair of channels 98 and 99 disposed beneath a diverting bulk head 100. The bottom portion 101 of diverting bulk head 100 separates the channels 98 and 99 for segregated grain flow therethrough and thus require a pair of upper and lower actuation valves as shown herein. Upper valve 75 comprises an elongate slide member 106 extending across and between said channels 98 and 99. The slide valve 106 is sandwiched between upper slide plate 103 and lower slide plate 105 in upper valve 75 and coupled to the appropriate solenoid actuation mechanism, shown in FIG. 1 above. Lower slide valve 77 comprises the elongated slide member 110 sandwiched between an upper slide plate 107 and lower slide plate 109 each disposed in respective discharge channels 98 and 99. Linear actuation of the slide members 106 and 110 in the direction of arrows 111 thus respectively open and close the channels 98 and 99 to the flow of grain therethrough.

The utilization of the grain steam discharge system 18 in the lower end of the steam vessel 12 will obviously generate a steam back pressure. The conventional steam chest designs, steam and gas is permitted to egress from both the lower and upper extremities of the vessel to prevent the accumulation of pressure therein. For this reason the walls of the steam chest are often weak and flimsy and generally incapable of withstanding of any substantial pressure. For this reason, the retrofitting of the system 10 of the present invention requires reinforcement of conventional steam chests by the utilization of reinforcing bands 97 as shown in FIGS. 1 and 2. The use of reinforcing bands 97 depends upon the size of the vessel 12 as well as the amount of pressure generated therein. By using such bands 97 disposed in parallel spaced relationship longitudinally about the steam vessel 12 existing steam chests can be retrofitted for use in accordance with the system 10 of the present invention. As will be described in more detail below, the generation of steam pressure therein through the use of the air lock, air steam grain discharge system 18 increases the efficiency of the system and promotes a more homogeneous grain treatment the side effect of which is increased vessel pressure which must be addressed for both structural and safety reasons. It may further be seen that the utilization of reinforcing sections in both rectangular and cylindrical steam vessels is shown herein in accordance with the principles of the present invention.

As shown herein, the region between upper valve 75 and lower valve 77 create separate chambers 112 and 114 which comprise steam or air lock chambers containing grain therein and preventing the passage of steam therefrom Slide valves 75 and 77 sequentially actuate to uniformly drop the grain and prevent any continual opening between said valves for the discharge of steam from the diverter section 100. Valve 75 is actuated first in a rapid manner to drop the grain uniformly and to permit grain to fill the chambers 112 and 114 and then closes prior to the opening or actuation of valve 77 which permits grain contained within chambers 112 and 114 to egress downwardly therefrom as heated grain 82. This particular slide valve arrangement is shown for purpose of illustration only and may be combined into a single pair of upper and lower slide valves for actuation through a single discharge passage in an embodiment when dual passage 98 and 99 are brought together to a single discharge area. The presently shown configuration, however, illustrates the utilization of plurality of discharge valves coupled for synchronous and sequential operation as defined above for the steam lock and steam and grain handling aspects of the present invention.

Referring now to FIG. 3 there is shown one embodiment of the pyramid shaped steam diffuser 90 comprising inner conduit 92 and outer cowling 94. The shape of cowling 94 can vary as described below. A plurality of apertures 121 are formed in the sidewalls of the cowling 94. The sidewalls of this particular embodiment comprise upper walls 123 including a tapered roof configuration above conduit 92. The conduit 92 turns upwardly through discharge elbow 93 for upward diffusion of steam. Generally parallel spaced sidewalls 125 depend from upper roof section 123 and are connected by a lower bottom 127. Each of the above walls and bottoms contain apertures 121 for effectively discharging and diffusing steam 96 and water accumulation therefrom into the grain 47 flowing therearound. As described above, said grain flow will be maintained uniformly through and across the chamber 16 through the flow diverting mechanism 100 which prevents the stagnation of grain flow around the side walls of the chamber 16 as described in more detail below.

Referring now to FIG. 4 there is shown one embodiment of diverter structure 100 constructed in accordance with the principles of the present invention for the effective distribution of steam. Diverter 100 comprises a central apex 101 from which depends 8 angulated walls. The diverter walls are constructed in a T-shaped configuration 134 comprising a wide central diverter arm 135 which intersects an intermediate orthogonal engaging diverting section 134. The lower region of arm 135 comprises left and right diverting sides 132 and 136 while the upper region comprises left and right diverting walls 137 and 138 The orthogonal intermediate wall arm comprises lower wall sections 141 and 143 and upper sections 140 and 142.

Still referring to FIG. 4, grain 47 engaging said T-shaped diverting section 100 is thus split into four columns of grain whereby the corner sections of grain 47 disposed thereabove are urged to fall downwardly therethrough in conjunction with any grain in any intermediate section resting above apex 101. This separation facilitates even distribution and flow of grain 47 downwardly through the chamber 16 and is necessary in accordance with the principles of the present invention. The diversion of the grain is then collected by lower angulated walls 145, 148, 147 and 149, these walls shown in FIG. 1 thus recollect the diverted grain into two columns separated by overlying bridge 101 lying beneath diverter 100. The duality of collected grain facilitates diversion and collection of grain from all regions of the upper passage 16 of this particular embodiment. Scouring of the side walls is therein facilitated to remove any "stagnant" grain of the type which has plagued the prior art. Grain collected in passages 98 and 99 comprise a uniform mixture of grain 47 falling through the chamber 16 and thus representing a homogeneous accumulation through which slug flow is facilitated by the upper and lower valves 75 and 77 through their sequential actuation.

Figure 5A:
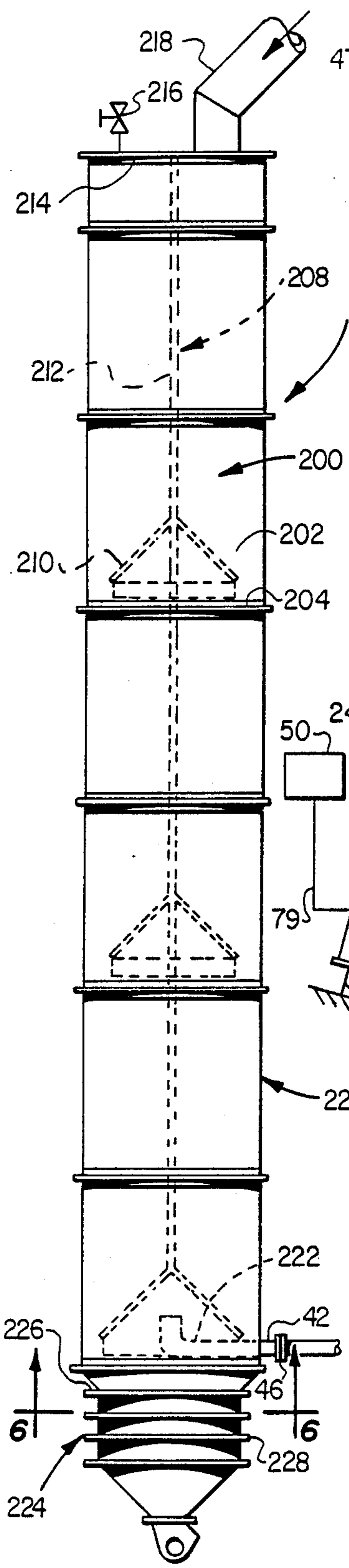
FIG. 5A is a side-elevational view of an alternative embodiment of a grain treatment vessel illustrating an alternative manner of grain distribution flow therethrough.

Referring now to FIG. 5A there is shown an alternative embodiment of the grain handling system 10 of the grain handling vessel 12 of the present invention wherein a cylindrical silo 200 is illustrated. The vessel 200 comprises cylindrical chamber 202 having a plurality of supporting bands 204 secured therearound for facilitating the pressures established therein. Uniform grain flow is facilitated therethrough by a diverting plate system 208 comprising a plurality of conical or pyramid shaped diverting members, or hats 210. Each diverting hat 210 of this particular embodiment is suspended by a central tether 212 secured to a top plate 214. Grain 47 passing within the vessel 200 is thus forced to flow outwardly around each diverting hat 210 which prevents accumulation of grain 47 in any central area of the vessel wherein "coring" could result and promotes the uniform flow of the grain therethrough. The cylindrical vessel 200 is also capable of handling increased pressures and grain weight loading whereby a pressure relief valve 216 is disposed thereabove. A grain input stack 218 is provided for the flow of grain therein. In the lower region 220 of the chamber 200 a steam input pipe 222 is shown. Therebeneath, a lower grain discharge garner system 224 is illustrated to comprise either one or two discharge valves 226 and 228 comprising a steam lock chamber therebetween. In this configuration the flow of grain is facilitated in such a manner than distinct channel diversion, as shown in FIGS. 1–4, is not necessary and thus the simplified discharge/airlock section 224, may be utilized. It should likewise be noted, however, that the multiple hat grain diverting system 208 shown in FIG. 5 may likewise be used in existing steam chests, as described hereafter.

Figure 6:
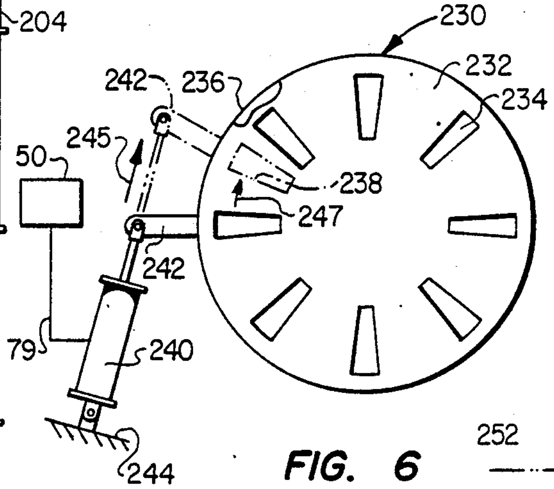
FIG. 6 is a bottom-plan, cross-sectional view of one of the rotary discharge valves of the grain treatment of FIG. 5 taken along the lines 6—6 thereof.

The grain discharge/airlock system 224 may comprise either slide valves or rotary valves. One embodiment of a rotary valve 230 is shown in FIG. 6 wherein a valve plate 232 is presented with a plurality of apertures 234 therein. A second plate 236 is disposed therebeneath likewise having a plurality of apertures 238 formed therein adapted for registry with the apertures 234 of the upper plate 232. A pneumatic cylinder 240 or other motive device is coupled to the lower plate through an actuation arm 242. The actuation cylinder 240 is secured to a rigid member 244 for facilitating actuation thereof. The actuation cylinder 240 is also coupled to the control unit 50 by control line 79 as presented in FIG. 1. By actuation of the cylinder 240 in the direction of arrow 245 the lower plate member 236 is rotated in the direction of the arrow 247 to cause the apertures 234 and 238 to fall in and out of registry and allow the grain to drop therethrough in select quantities. The quantity of grain falling depends upon the duration of said registration and the volume therebeneath. A time span of less than one second has been shown to be sufficient to fill the volume between said valves. It should be noted that a pair of valve members 230 vertically disposed one from the other is necessary for each discharge region. The sequential opening and closing of upper and lower rotary valves 230 will likewise create a "plug flow" of grain through the vessel 200 which facilitates the uniformity of said flow therethrough preventing frictional blockage and enhancing the uniform heating of grain therein. As stated, the laminar flow profile which often manifests stagnant flow areas is not allowed to develop with plug flow.

Figure 5B:
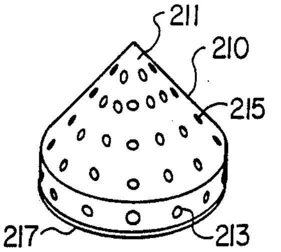
FIG. 5B is a perspective view of the conical grain flow diverter of FIG. 5A.

Referring now to FIG. 5B there is shown an enlarged perspective view of one embodiment of a tapered canopy or anti-coring hat 210 as previously described herein. The hat 210 is comprised of a conical upper surface 211 fabricated from sheet metal or the like with a depending skirt 213 formed therearound. The skirt 213 is preferably welded to the conical surface 211 forming a cylindrical base for structural support thereof. Throughout a plurality of apertures 215 are therein provided both in the conical surface 211 and the in skirt 213 for diffusion of steam therefrom when the hat 210 is utilized as a steam sparger or diffuser. A plate 217 is likewise secured therebeneath for enhancing the structural strength of the hat 210 which is supported by tether 212. Structural strength is an important consideration in the diverting hat 210 because of the enormous weight of grain within the steam chest. The weight of the grain has been shown to collapse diverting members which are not of sufficient structural integrity. The presence of the lower plate 217 further inhibits the collapse of the conical surface 211. The skirt 213 further provides means for introduction of steam discharge conduit 222 therein when the hat is utilized for steam diffusion within the steam chest 200. As shown herein any of a plurality of tapered canopies may be utilized in the present invention for placement within the steam chest wherein flow diversion of grain therearound is afforded. The presence of the hats 210 specifically prevents the deleterious coring which may occur particularly in systems not incorporating the garner gate system as described herein.

The particular containment vessel of the present invention overcomes many of the above described disadvantages of the prior art. The cylindrical steam chest 200 is more structurally suited for pressurization during grain processing thus permitting an elevated temperature therein. The use of stainless steel in construction also produces much smoother side walls which reduce laminar flow considerations in grain plug flow as compared to older, prior art steam chests. Moreover, the circular vessel eliminates corner sections, the problem of corner draw-off, and the possiblity of the aforesaid stagnated grain regions, bacteria growth, post-operational conductive cooling, and grain contamination. These prior art problems are most serious. The single or dual gate, garner discharge system is also shown to be constructed for passing grain through the containment vessel in a plug flow manner. During plug flow, whether uniform or by "dropping" of the grain volume, the laminar flow profiles indigenous to conventional steam chest, grain containment vessel systems is not present. Such flow profiles greatly accentuate the laminar flow boundary through frictional engagement of the grain with the side walls of the steam chest. As stated, this is most pronounced in older steam chests with rough sidewalls manifesting higher frictonal characteristics. During plug flow, the grain drops as a slug of particulate matter through the vessel and either through a flow restriction orifice (to be described below) or through a plurality of apertures formed in the upper gate network. The intermediate anti-coring hats 210 disposed within the steam chest 200 further eliminate the possibility of coring during grain passage. As shown herein the presence of the hats 210 further facilitate symmetrical and efficient entry of steam 96 into the grain volume by serving as a steam sparger and affording a centrally disposed discharge and diffusing unit.

Referring now to FIG. 7, there is shown one alternative embodiment of the grain handling system 10 of the grain handling vessel 12 of the present invention wherein a modified discharge system is incorporated. The rotary valve system 224 discussed above and a rotary valve 230 is not incorporated in this particular embodiment which does incorporate a discharge conduit 250. The discharge conduit 250 functions to vary the pressure at the grain discharge orifice 250A, which will be seen to be an alternative to the valve/garner system in accordance with the present invention.

Still referring to FIG. 7, the airlock system 224 comprises an extended conduit 250 which is curved and brought upwardly to a level 252 wherein conduit section 254 is arced for discharge of grain therefrom. Discharge section 256 depending therefrom allows the grain to be discharged while section 254 is supported by supports means 258 in the form of a tether and hook arrangement 259. Grain emitted from the discharge airlock system 224 is thus carried downwardly in a flow pattern indicated by air 260 and upwardly through the conduit 250 by arrow 261 to be ejected as indicated by arrow 262. The airlock provision is provided by raising the point 252 to a level relative to the vessel 200 wherein the steam pressure is substantially reduced relative to the grain 47 contained therein. Level 252 may vary depending on the volume of steam discharged into the steam vessel 200 and the pressure accumulation therein. For this reason the conduit 250 may be of a flexible variety and the support tether 258 may be raised or lowered to control the volume of discharge. The magnitude of grain 47 rising as arrow 261 within the conduit 250 presents a substantial blockage to the discharge of steam within the vessel to serve as a discharge airlock system. Likewise the utilization of valve 216 and the diverting hats 210 within the chamber 200 are utilized to further facilitate the uniform flow of grain therethrough and the homogeneous treatment thereof. This system may be seen to be very effective in treating grain without the utilization of the complexities of the pneumatic cylinder actuated valve system and particularly in the passage of particulate matter mixed with steam and non-condensible gases wherein a substantially fluidized state exists to permit the flow of the grain therethrough. It may be seen that a single rotary valve may be utilized in conjunction with the system comprising discharge conduit 250 of the present invention in that the back pressure-steamlock aspect is addressed herewith. In some configurations the utilization of the discharge conduit 250 and the flexibility of establishing a select pressure line 252 may permit the elimination of all valve mechanisms for simplification in the valve treatment system as should be noted to be a distinct advantage in such industries.

Referring now to FIG. 8, there is shown a side-elevational diagrammatic view of an alternative embodiment of the grain treatment system of the present invention. As illustrated herein the system 310 comprises a vessel 312 having a central diverting member and steam sparger 314 secured therein. The side walls 316 beneath the steam sparger 314 taper downwardly to an orifice 318 adapted for choking the flow of grain and steam therethrough. The orifice 318 comprises an elongate throat 320 depending into lower garner section 322. A grain accumulation 324 is thus formed therein and covers the end of the orifice throat. In this configuration steam 325 within the upper steam vessel 312 is substantially precluded from egressing from the lower region thereof and encouraged to evenly percolate upwardly (arrows 327) through said vessel for uniformly engaging and treating the grain therein as set forth and described above. Some steam will pass downwardly through throat section 320 and therefore, a plurality of steam vent stacks 330 are shown herein extending upwardly alongside the grain vessel. In this particular embodiment the steam venting stacks 330 are connected to the side walls 331 of the vessel for discharging excess steam therefrom. Steam from region 322 is returned to the vessel 312 at steam vent coupling point 332, raised sufficiently above the steam sparger 314 to engage an area of substantially reduced, or limited vapor pressure. In this manner, excess steam pressure is vented from the lower discharge region without a steam loss. As stated above, it is important that excess steam pressure be discharged rather than permitted to egress with the grain into peg feed rollers 335 or the like disposed therebeneath. The presence of fluctuating steam pressures at a peg feed roller 335 has been shown to cause erratic flow rates and seriously encumber the efficient operation of peg feed rollers and the like.

Referring now to FIGS. 1 and 5A in combination, it may be see that the discharge of steam and non-condensible gases produces a mixture capable of heating and moisturizing grain concomitantly yet in a uniform and homogeneous manner preventing agglomeration of the grain within the vessel of either a rectangular or cylindrical configuration. For this reason grain is further encouraged to drop in a uniform manner which in conjunction with the grain diverter means comprising either the diverting bulk head 100 or the hot grain diverting system 208 prevents any residual grain collection leading to mildew, the growth of fungus, bacteria and/or rotting. Uniform flow also facilitates uniform heating as said grain is cooked within the vessel for preselect periods of time necessary for producing preselect starch availability and the increase in the food value of the grain 47 passing therethrough. It is thus believed that the operation and construction of the present invention will be apparent from the foregoing description. While the method and apparatus shown and described has been characterized as being preferred, it will be obvious that various changes and modifications may be made therein without departing from the spirit and scope of the invention as defined in the following claims.

What is claimed is:

1. An improved grain treatment system for selectively conditioning substantially homogeneous plugs of grain with a conditioning medium comprising:

a substantially vertically disposed vessel having an upper and lower end, said vessel having an inlet in said upper end and an outlet in said lower end such that said grain can be passed therethrough;

means for controlling the flow of grain within said vessel, said flow control means causing said grain to flow within said vessel in substantially homogeneous plugs; and means for injecting said conditioning medium into said vessel for contact with said substantially homogeneous plugs of grain to produce substantially homogeneous plugs of conditioned grain;

said flow control means including first and second flow valves and means for sequentially opening and closing said first and second flow valves;

wherein the sequential opening and closing of said first and second flow valves cause said grain in said vessel to flow in substantially homogeneous plugs.

2. Grain conditioning system according to claim 1 wherein said flow control means further comprises a chamber disposed between said first and second flow valves, said first flow valve controlling entry of grain into said chamber and said second flow valve controlling the exit of grain out of said chamber.

3. Grain conditioning system according to claim 2 wherein said first flow valve opens to fill said chamber with conditioned grain and closes when said chamber is filled and said second flow valve opens to empty said conditioned grain to said outlet and closes when said chamber is empty.

4. Grain conditioning system according to claim 1 wherein said first and second flow valves are slide valves and include a slide plate, said opening and closing of said slide valves controlled by linear motion of said slide plates in a direction substantially perpendicular to said vessel.

5. Grain conditioning system according to claim 1 wherein said first and second flow valves are rotary valves and include a valve plate with at least one aperture and a rotary plate with at least one aperture, said at least one aperture of said rotary plate adapted for registry with said at least one aperture of said valve plate.

6. Grain conditioning system according to claim 5 wherein said means for sequentially opening and closing said first and second flow valves further comprises a pneumatic cylinder coupled to said rotary plate, said pneumatic cylinder rotating said rotary plate into and out of registry with said valve plate.

7. An improved grain treatment system for selectively conditioning substantially homogeneous plugs of grain with a conditioning medium which includes at least steam comprising:

a substantially vertically disposed vessel having an upper and lower end, said vessel having an inlet in said upper end and an outlet in said lower end such that said grain can be passed therethrough;

means for controlling the flow of grain within said vessel, said control means causing said grain to flow within said vessel in substantially homogeneous plugs, said flow control means including a flow valve and means for sequentially opening and closing said flow valve;

means for injecting said conditioning medium into said vessel for contact with said substantially homogeneous plugs of grain to produce substantially homogeneous plugs of conditioned grain; and a curved discharge conduit attached at the outlet of said vessel, said discharge conduit curving upward to an upwardly extending portion which carries said conditioned grain in an upward direction, said upwardly extending portion curving downward to a downwardly extending portion which discharges said conditioned grain.

8. Grain conditioning system according to claim 7 further comprising means for supporting the upwardly extending portion of said discharge conduit.

9. Grain conditioning system according to claim 8 wherein said support means further comprises means for adjusting the height to which said upwardly extending portion of said discharge conduit extends, said height adjusting means also adjusting the volume of discharge.

10. Grain conditioning system according to claim 9 wherein said support means further comprises a tether and hook arrangement.

11. Grain conditioning system according to claim 7 wherein said upwardly extending portion of said discharge conduit extends to a height wherein the steam pressure is substantially reduced relative to said grain, thereby producing an airlock effect.

12. Grain conditioning system according to claim 11 wherein said flow valve is a rotary valve and includes a valve plate with at least one aperture and a rotary plate with at least one aperture, said at least one aperture of said rotary plate adapted for registry with said at least one aperture of said valve plate.

13. Grain conditioning system according to claim 12 wherein said means for sequentially opening and closing said flow valves further comprises a pneumatic cylinder coupled to said rotary plate, said pneumatic cylinder rotating said rotary plate into and out of registry with said valve plate.

* * * * *

UNITED STATES PATENT AND TRADEMARK OFFICE

CERTIFICATE OF CORRECTION

PATENT NO. : 4,939,988
DATED : July 10, 1990
INVENTOR(S) : W. Gerald Wyatt and Jim Bleke It is certified that error appears in the above-identified patent and that said Letters Patent is hereby corrected as shown below:

| | |
|---|---|
| Column 6, line 23 | delete "filled A single"<br>insert --filled. A single-- |
| Column 6, line 37 | delete "generator Steam"<br>insert --generator. Steam-- |
| Column 8, line 27 | delete "conduit"<br>insert --conduit,-- |
| Column 10, line 25 | delete "line 69 Water"<br>insert --line 69. Water-- |
| Column 12, line 44 | delete "therefrom Slide"<br>insert --therefrom. Slide-- |
| Column 17, line 5 | delete "see"<br>insert --seen-- |
| Column 17, line 13 | delete "hot"<br>insert --hat-- |

Signed and Sealed this

Twenty-sixth Day of November, 1991

*Attest:*

HARRY F. MANBECK, JR.

*Attesting Officer*

*Commissioner of Patents and Trademarks*